Figure 3:
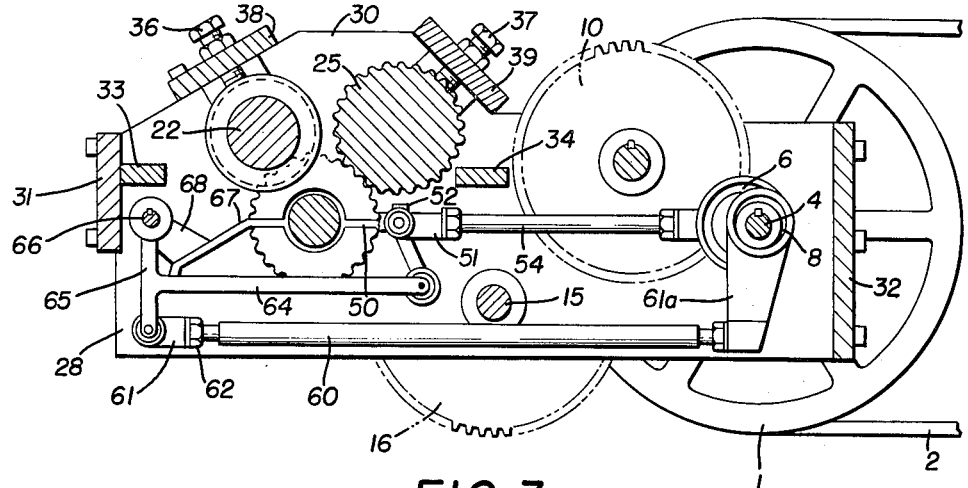

Feb. 1, 1966　　　J. S. ECKERT　　　3,232,589
SADDLE FOR TREATING TOWER
Filed Jan. 6, 1961　　　5 Sheets-Sheet 1
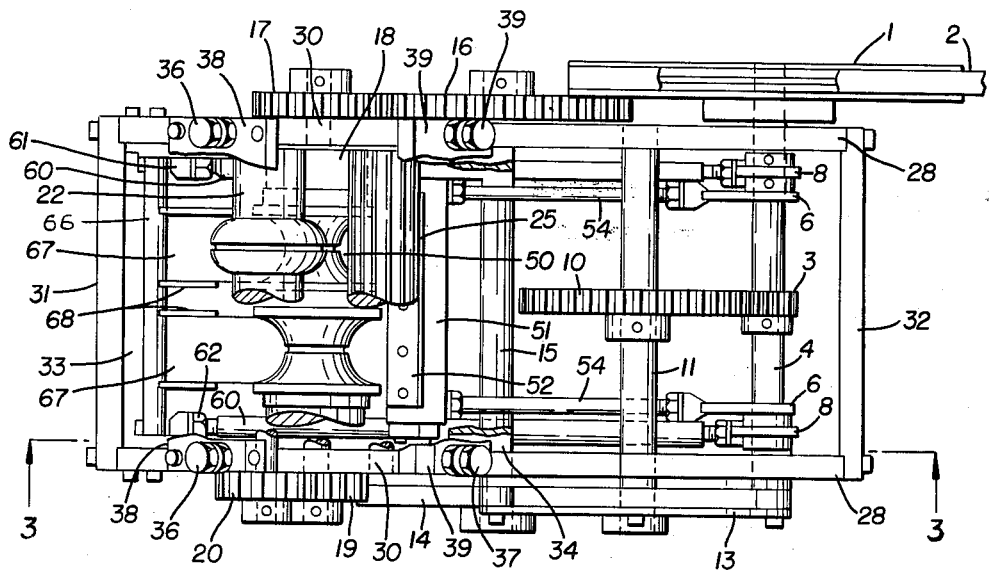
FIG. 1
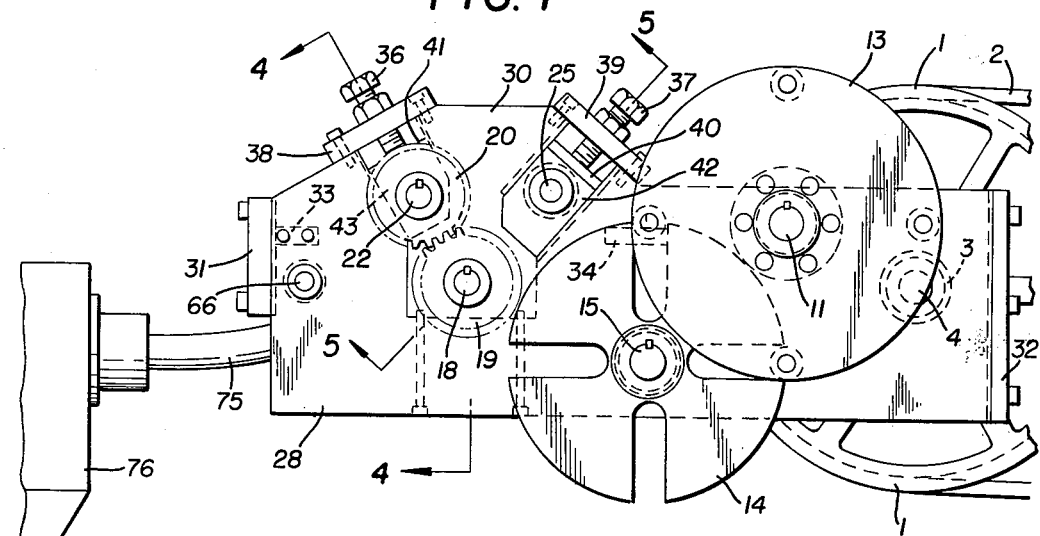
FIG. 2
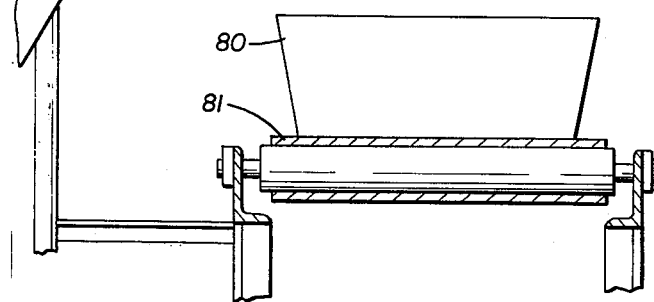
INVENTOR.
JOHN S. ECKERT
BY
ATTORNEY Feb. 1, 1966   J. S. ECKERT   3,232,589
SADDLE FOR TREATING TOWER
Filed Jan. 6, 1961   5 Sheets-Sheet 3

INVENTOR.
JOHN S. ECKERT
BY
ATTORNEY

Feb. 1, 1966  J. S. ECKERT  3,232,589
SADDLE FOR TREATING TOWER
Filed Jan. 6, 1961  5 Sheets-Sheet 4

INVENTOR.
JOHN S. ECKERT
BY
*Jordan C. Mask*
ATTORNEY

INVENTOR.
JOHN S. ECKERT

United States Patent Office 3,232,589
Patented Feb. 1, 1966

3,232,589
SADDLE FOR TREATING TOWER
John S. Eckert, Silver Lake, Ohio, assignor to The United States Stoneware Company, Tallmadge, Ohio, a corporation of Ohio
Filed Jan. 6, 1961, Ser. No. 81,189
3 Claims. (Cl. 261—95)

This application is a continuation-in-part of my application Serial No. 795,418, filed February 25, 1959 which has matured into U.S. 3,060,503.

This invention relates to saddles with scalloped edges to be used in a treating tower for exposing a large surface of a liquid to a gas. The saddles are toroidal, generally being half-spool shape, with flaring ends and thin walls. The edge of each flaring end is scalloped.

Saddles have been previously used as packing in treatment towers. They are generally made of a stiff clay composition which is subsequently fired almost to the sintering point, but they can be made of any stiff plastic which can be rigidified during or after forming, or they may be metal or ceramic.

In making the saddles, the plastic is first extruded as a U-shaped ribbon, and this is pressed to shape, and the saddles are cut from it. There is preferably a lengthwise rib which projects from the middle of both surfaces of the extruded ribbon, and this rib is continued into the final product. It prevents the saddles from packing and also increases the edge area of the ribbon from which liquid is adapted to drip. In a tower, the major portion of the transfer from a gas to a liquid, and vice versa, takes place during the transfer of the liquid from one packing element to another. Therefore, the larger the number of points of each individual saddle from which the liquid drips, the greater the efficiency of the tower, and in the saddles of this invention the edges are scalloped to increase the number of points from which the liquid drips.

In the manufacture of plastic saddles, a ribbon of the plastic is extruded first and this is formed into the saddle by pressing it into the generally concave surface of a female forming roll by the generally convex surface of a male forming roll. These two forming rolls have surfaces of revolution. The formed ribbon is held against the female forming roll and its edges are scalloped by a trim roll with a scalloped surface. Each saddle is cut from the end of the ribbon while on the female forming roll, and is ejected from the concavity of this roll in completed form, except for firing. The rolls are rotated intermittently by a Geneva driver and the saddles are cut and ejected from the female roll as it moves through zero speed.

Each forming roll is preferably provided with a groove around its center to form and accommodate beads on the extruded ribbon, but if the ribbon is smooth the roll surfaces may be smooth. The rolls are described as generally convex and concave, meaning that they may or may not be grooved or otherwise indented or embossed.

Tests have shown that saddles with scalloped edges are more efficient than identical saddles with smooth edges. They do not shake down or pack together as readily as smooth-edged saddles and they are capable of handling a gas and liquid at a higher rate than smooth-edged saddles.

Figure 4:
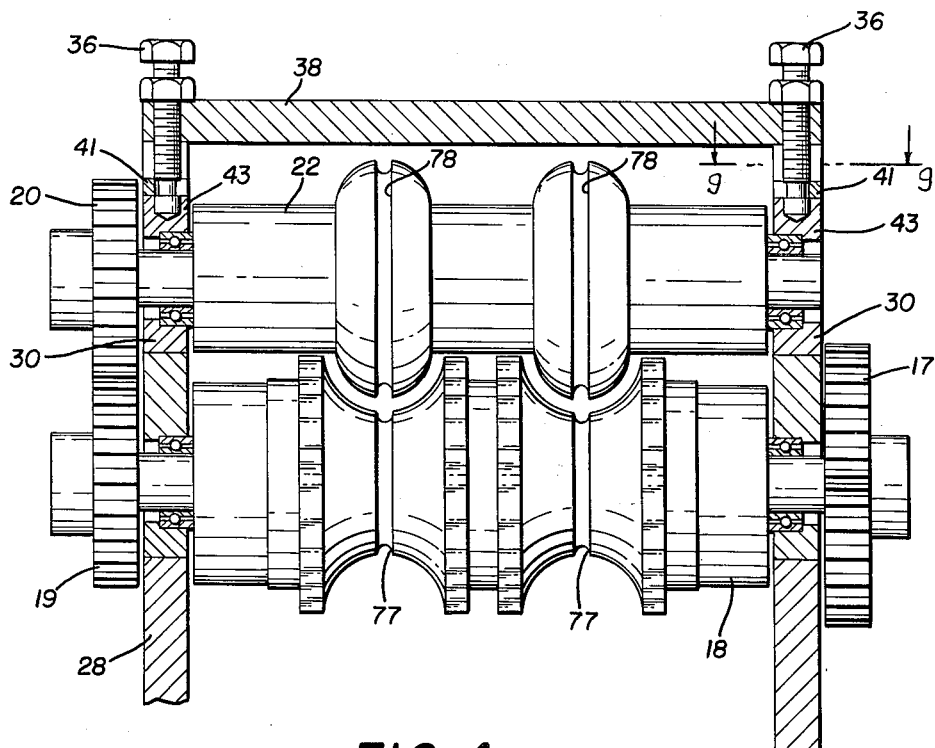
Figure 5:
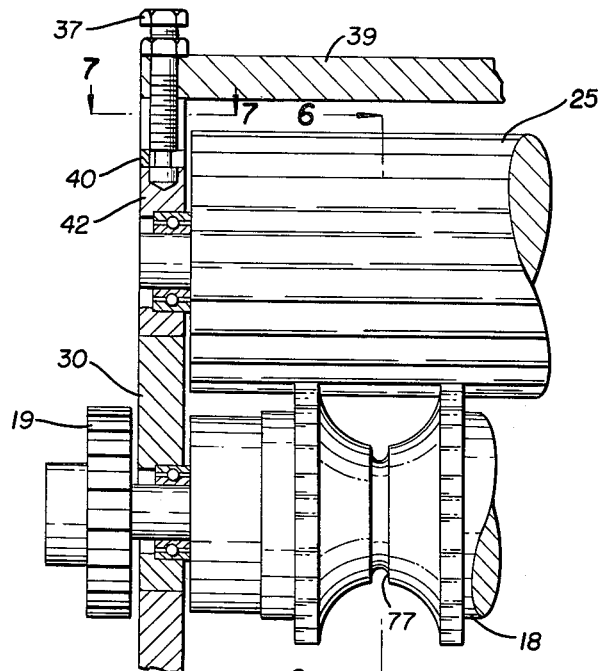
Figure 7:
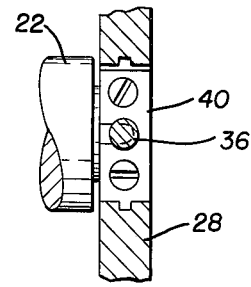
Figure 8:
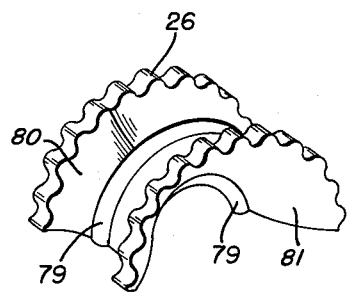
Figure 6:
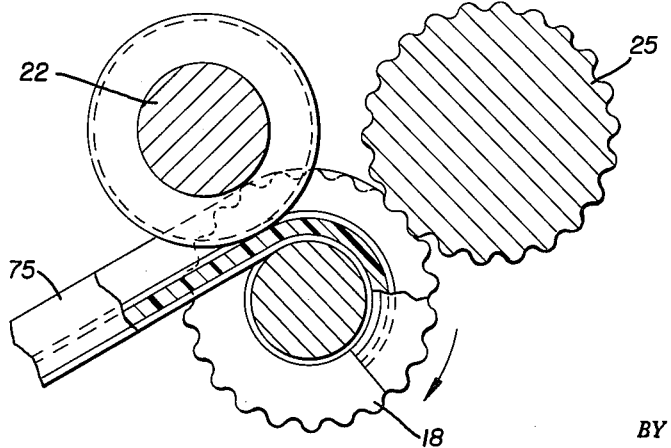
Figure 9:
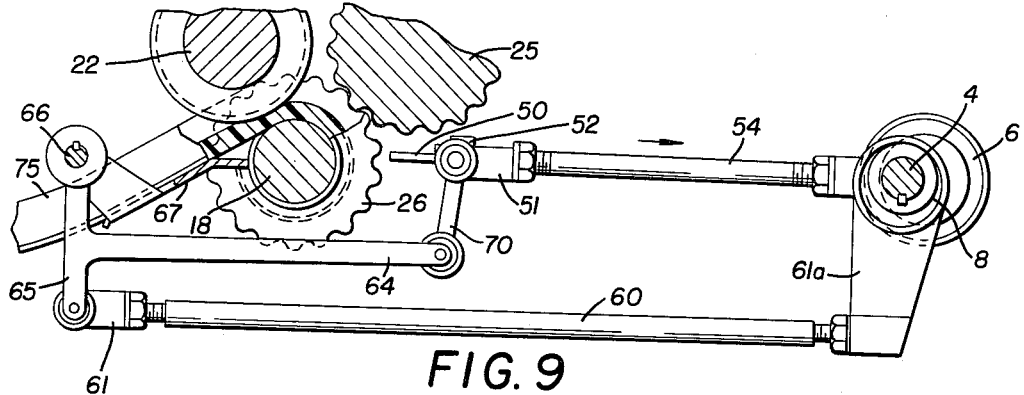
Figure 10:
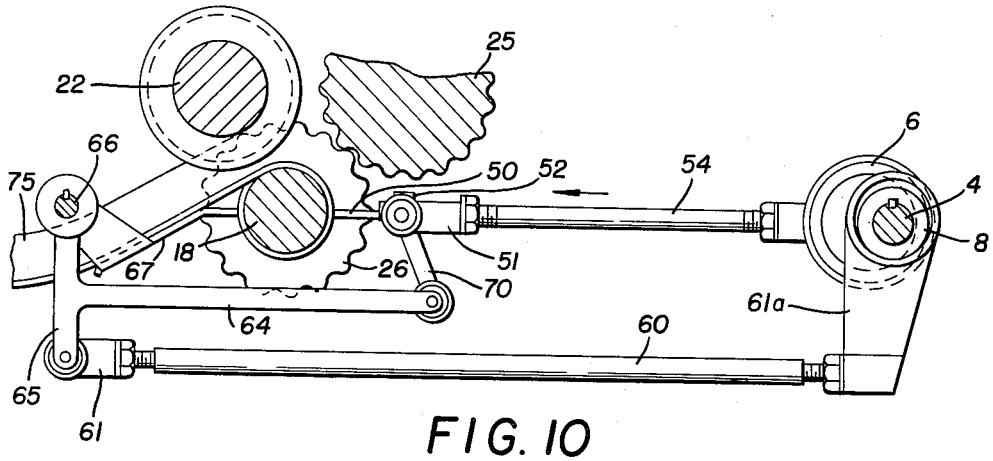
Figure 11:
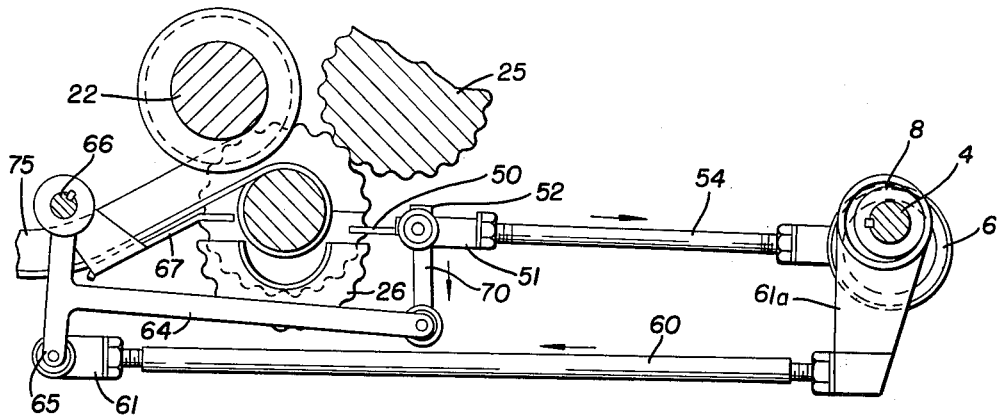
Figure 12:
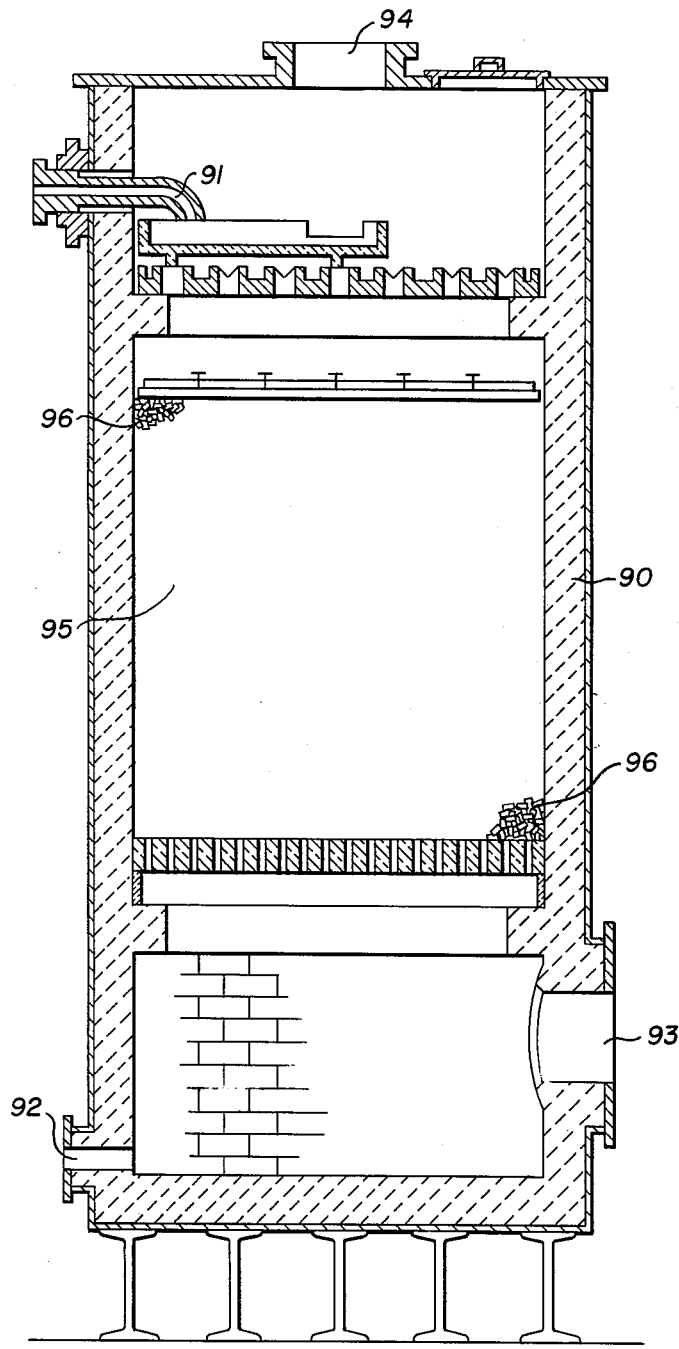

The invention will be described in connection with the accompanying drawings which show duplicate rolls, etc. for forming two saddles at the same time from different ribbons of plastic. In the drawings:

FIG. 1 is a plan view of the saddle-forming equipment;
FIG. 2 is a side elevation of the equipment, showing a ribbon of plastic passing from an extruder to the forming rolls, etc.;
FIG. 3 is a sectional elevation of the equipment on the line 3—3 of FIGURE 1;
FIG. 4 is a section on the line 4—4 of FIGURE 2 showing the two forming rolls;
FIG. 5 is a section of the female forming roll and the trim roll on the line 5—5 of FIGURE 2;
FIG. 6 is a detail on the line 6—6 of FIGURE 5;
FIG. 7 is a section on the line 7—7 of FIGURE 5;
FIG. 8 is a view in perspective of the saddle;
FIGS. 9, 10 and 11 show the cut-off and ejector mechanism in different positions in the operating cycle, and
FIG. 12 is a section through a tower containing the new saddles.

The drive pulley 1 is driven counterclockwise by the belt 2 by a motor or other equipment not shown. The drive pulley and Geneva pinion 3 are keyed to the drive shaft 4. Also keyed to the shaft 4 are the cut-off cam assemblies 6 and the ejector cam assemblies 8.

Geneva pinion 3 drives the bull gear 10 mounted on Geneva driver shaft 11. Also mounted on shaft 11 is Geneva driver 13 which drives Geneva star 14 which is mounted on one end of Geneva star shaft 15. On the opposite end of the shaft 15 is the large gear 16 which meshes with the small gear 17 which is keyed to the female forming roll 18. At the opposite end of the female forming roll is the roll timing gear 19 which meshes with the roll timing gear 20 on the end of the male forming roll 22. The edges of the female forming roll 18 and the surface of the trim roll 25 are scalloped. The trim roll rests on this forming roll, or it may be convex and dip between the scalloped flanges on the forming roll 18. The scallops of these respective rolls may mesh with one another (FIGURE 6) or the trim roll may be independently driven. The scallops are spaced any desirable distance, and they are made as pointed as feasible. The scallops on the trim roll form the scallops 26 (FIGURE 8) on the saddles. The edges of the adjacent indented surfaces which form the scallops meet in substantially line contacts in the saddle edges. The liquid drips from these, greatly increasing the number of interstitial transfer points for the liquid in the tower.

The edges of the respective male and female forming rolls are aligned and they are spaced just far enough apart to form a saddle between them (FIGURE 4). Because the gears 19 and 20 on the female and male forming rolls mesh with one another they are rotated in opposite directions. Being driven by the star wheel, their motion is intermittent, for a reason to be explained.

The gear ratios of the gears 3 and 10 and the gears 16 and 17 is such that the gear 17 rotates only half as fast as the gear 3. Thus the cams in the assemblies 6 and 8 make two revolutions for each revolution of the forming rolls. For the manufacture of small saddles, it is desirable to make the rolls of relatively larger diameter to prevent their bending, and the gear ratio will be changed in order to coordinate the various operations.

The various shafts and rolls are supported in the frame 28 in suitable bearings, etc., and, as best shown in FIGURE 2, the two forming rolls and the trim roll are supported in a bearing block 30 in said frame. The side walls of the frame are held together at the front by the front frame plate 31 and at the back by the rear frame plate 32. The cross plates 33 and 34 space the side walls of the frame. As best shown in FIGURE 2, the shafts extending from the ends of the male forming roll 22 and the trim roll 25 are supported in bearing blocks and positioned by adjusting screws 36 and 37 threaded into cross plates 38 and 39. The screws bear against retaining plates 40 and 41 adjacent the bearing blocks 42 and 43 which fit between the frame proper and the main bearing block 30.

A separate ribbon of plastic is fed between each two forming rolls. For each forming roll there is a knife 50 the cutting edge of which is generally circular. If there is a groove at the center of the female forming roll there may be a projection at the centerline of the knife, although it is not essential for the knife edge to fit the contour of the forming roll exactly.

A knife for each forming roll is clamped to the cut-off knife holder 51 by the cut-off knife clamp 52. Connecting rods 54 conect the cut-off knife holder with the cut-off cam assemblies 6, each of which includes a cam and bearing. Thus on each revolution of the drive shaft 4 the knives are moved substantially radially into contact with the female forming rolls and then withdrawn from contact therewith a sufficient distance to permit a ribbon of plastic to pass between each knife edge and forming-roll surface. The movement of the female forming roll ceases as the knife is brought into contact with it and cuts a completely formed saddle from the end of the plastic ribbon. Each saddle, as it is cut from the ribbon, is completely formed except for drying and firing.

The ejector is also operated from the drive shaft 4. One end of the ejector connecting rod 60 is held in the cross brace 61a which is suspended vertically from each ejector cam assembly 8. Each of these cam assemblies includes a cam and cam bearing. The other end of each connecting rod 60 is held in an ejector-rod end 61 by an ejector-rod nut 62. The ejector-cutter arm is T-shaped and comprises the elongated relatively horizontal stem portion 64 and the short relatively vertical cross arm 65. The ejector-rod end 61 is swivelly supported from the bottom of the cross arm 65, and the top of the cross arm 65 is swivelly supported from the ejector shaft 64. The ejector is made of a bent sheet-metal plate 67 the sides 68 of which are bent up and fastened to the ejector shaft 66 (FIGURE 3). The free end of the horizontal ejector arm 64 is connected with the cut-off knife holder 51 by the ejector-cutter link 70. One end of this link is swivelly attached to the ejector-cutter arm 64 and the other end is swivelly connected to the cut-off knife holder 51.

The operation of the cut-off knives and ejector is best explained in connection with FIGURES 9–11. The ribbon of plastic material 75 is fed from the extruder 76 (FIGURE 2) between the concave and the convex surfaces of the male and female forming rolls where it is pressed to shape. The grooves 77 and 78 at the centers of the forming rolls form the beads 79 (FIGURE 8) on the finished saddle. The ribbon adheres to the female roll and during the cutting of each saddle from the end of the ribbon and its separation from the female forming roll, the ribbon is held against this forming roll by the trim roll 25. The trim roll 25 scallops the edges of the saddle and also trims off any excess plastic from the ribbon just before each saddle is cut from it.

Each complete revolution of the Geneva driver 14 produces four 180-degree turns of the forming rolls. The cams of the cam assemblies 6 and 8 turn counterclockwise and continuously. Both cams have rotated through 180 degrees in passing from the position shown in FIGURE 9 to that shown in FIGURE 10, and another 90 degrees in passing to the position shown in FIGURE 11. Each time the knife 50 moves into contact with the surface of the female roll and severs a saddle from the ribbon of plastic, the forward end of this severed portion of the ribbon is in contact with the ejector. The knife is then withdrawn to the position shown in FIGURE 9 by rotating the cam 6 through 180 degrees. With the knife away from the roll, the star driver makes a one-quarter turn and this rotates the forming rolls through 180 degrees, bringing the forward end of the ribbon of plastic against the ejector 67. As the knife approaches the forming roll 18 (FIGURE 9) it is above its center and is moved toward it circumferentially and radially, with the circumferential speed of the knife matching that of the roll. The knife comes into full cut-off contact with the roll (FIGURE 10) at the moment when the speed of the roll passes through zero. From this moment on the circumferential speed of the knife is greater than the speed of the roll as the knife is withdrawn radially (FIGURE 11.) This accomplishes ejection on both the knife and ejector ends of the freshly cut saddle with a minimum of distortion. The action of the ejector is now explained.

The cross brace 61a hangs vertically at all times. As the cam 8 rotates, the cross brace is swung from one side to the other. In its extreme left position (FIGURE 11), the ejector 67 is moved down so that it is no longer directed radially toward the forming roll 18, and in moving down it presses against the forward end of the saddle. This movement of the ejector-cutter arm, depresses the free end of arm 64, pulling the cut-off knife 50 away from the freshly cut end of the ribbon of plastic. This downward movement of both the ejector, pressing against one end of the newly formed saddle, and the knife moving in the same general direction and pressing against the other end of the saddle, separates the finished saddle from the forming roll 18. It falls into the sagger 80 which is carried away by the conveyor belt 81. During the operation the forward end of the ribbon is held against the forming roll 18 by the trim roll 25 so that when rotation of the forming roll is resumed the ribbon of plastic moves with it and is positioned with its forward end against the ejector (as in FIGURE 9), ready for severance of another saddle from the plastic ribbon by the described reciprocating motion of the knife.

As the ejector-cutter link 70 swings to the right, the knife is moved away from the roll 18, as described, and as the roll makes another half turn the cut end of the plastic which adheres to the forming roll comes into contact with the ejector and when the rotation of the forming roll again ceases momentarily, the knife is pushed through the plastic into contact with roll 18. The movement of the ejector is a pivotal down and up movement, and the knife while retained in a substantially horizontal position executes a somewhat ovate movement.

FIGURE 8 shows in perspective the saddle of this invention. The saddle is a segment of the concave-convex inner peripheral portion of a hollow torus. Beads 79 protrude from both the concave surface 80 and convex surface 81. The torically curved edges are scalloped at 26.

FIGURE 12 shows the tower 90 with liquid inlet 91 and outlet 92, and gas inlet 93 and outlet 94. The chamber 95 is filled with scalloped saddles 96.

Modifications can be made in the equipment shown, as will be suggested to the man skilled in the art. The ratio of the length to the width of the saddles may vary. The major dimension may be varied from about ⅜ to 2½ inches, more or less. The surfaces of the forming rolls may be corrugated to increase the number of transfer points on the saddles.

The invention is covered in the claims which follow.

I claim:

1. An improved saddle suitable for use as a packing element in a treating tower, the saddle being a solid molded segment of the inner peripheral portion of a hollow toroid having sides flaring outwardly from the axis of the toroid to its edges, which sides have a convex surface toward the toroid axis and a concave surface away from the toroid axis, the edges of the outwardly flaring sides being scalloped, with the edges of the adjacent indented surfaces which form the scallops meeting at the saddle edges.

2. The saddle of claim 1 in which a bead protrudes from each surface thereof substantially midway between said scalloped edges.

3. The combination of a treating tower and a bed of the saddles defined in claim 1 therein.

References Cited by the Examiner

UNITED STATES PATENTS

| | | | |
|---|---|---|---|
| 1,796,501 | 3/1931 | Berl | 261—94 |
| 2,571,958 | 10/1951 | Slaughter et al. | 261—95 |
| 2,597,986 | 5/1952 | Halstead. | |
| 2,602,651 | 7/1952 | Cannon | 261—95 |
| 2,639,909 | 5/1953 | Leva | 261—95 |
| 2,834,466 | 5/1958 | Hament | 261—95 X |
| 2,848,751 | 8/1958 | Vernon. | |

FOREIGN PATENTS

| | | |
|---|---|---|
| 335,817 | 1/1920 | Germany. |
| 768,316 | 2/1957 | Great Britain. |

ROBERT F. BURNETT, *Primary Examiner.*

HARRY B. THORNTON, HERBERT L. MARTIN, *Examiners.*

D. M. RIESS, S. S. HUSTING, *Assistant Examiners.*